United States Patent [19]

Ewen et al.

[11] Patent Number: 4,530,914

[45] Date of Patent: Jul. 23, 1985

[54] PROCESS AND CATALYST FOR PRODUCING POLYETHYLENE HAVING A BROAD MOLECULAR WEIGHT DISTRIBUTION

[75] Inventors: John A. Ewen; Howard C. Welborn, Jr., both of Houston, Tex.

[73] Assignee: Exxon Research & Engineering Co., Florham Park, N.J.

[21] Appl. No.: 501,740

[22] Filed: Jun. 6, 1983

[51] Int. Cl.$^3$ ............................ C08F 4/64; C08F 4/68; C08F 4/62

[52] U.S. Cl. .................................. 502/113; 502/103; 502/117; 526/114; 526/160

[58] Field of Search ............... 502/113, 117, 103

[56] References Cited

U.S. PATENT DOCUMENTS

| | | | |
|---|---|---|---|
| 3,013,002 | 12/1961 | Breslow et al. | 502/117 X |
| 3,135,809 | 6/1964 | Bosmajian | 502/103 X |
| 3,306,919 | 2/1967 | Brantley et al. | 502/103 X |
| 3,316,233 | 4/1967 | Feay | 502/113 X |
| 3,663,635 | 5/1972 | Lassau et al. | 502/103 X |
| 4,310,648 | 1/1982 | Shipley et al. | 526/114 |
| 4,404,344 | 9/1983 | Sinn et al. | 502/154 X |

FOREIGN PATENT DOCUMENTS

| | | |
|---|---|---|
| 35242 | 9/1981 | European Pat. Off. . |
| 0069951 | 1/1983 | European Pat. Off. . |
| 2608863 | 3/1976 | Fed. Rep. of Germany . |
| 2608933 | 4/1976 | Fed. Rep. of Germany . |
| 1233599 | 5/1971 | United Kingdom . |

OTHER PUBLICATIONS

German Published Application 3,150,270 and an English Language Abstract.

Primary Examiner—Patrick P. Garvin
Attorney, Agent, or Firm—M. B. Kurtzman

[57] ABSTRACT

Polyolefins having a broad molecular weight distribution are obtained by polymerizing ethylene or higher alpha-olefins in the presence of a catalyst system comprising two or more metallocenes each having different propagation and termination rate constants and alumoxane.

7 Claims, 5 Drawing Figures

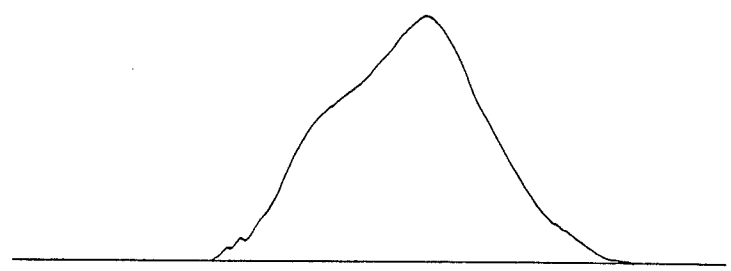
F I G. 1
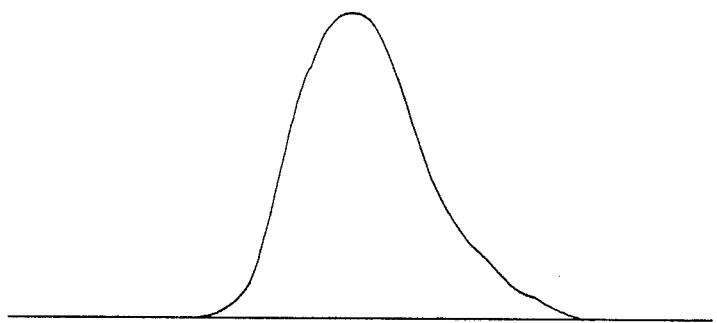
F I G. 2
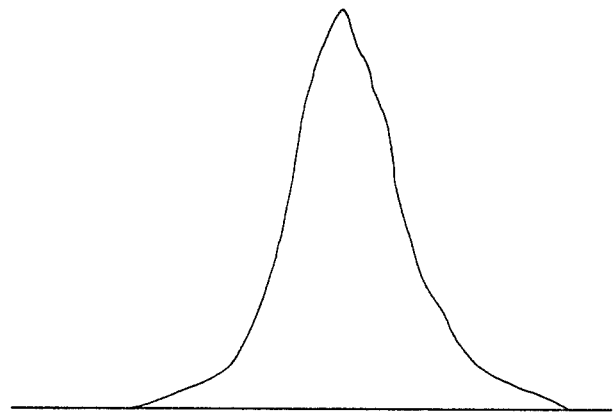
F I G. 3

PROCESS AND CATALYST FOR PRODUCING POLYETHYLENE HAVING A BROAD MOLECULAR WEIGHT DISTRIBUTION

The present invention concerns catalyst and process for the polymerization of ethylene. More particularly, the invention relates to catalysts and process for the polymerization of ethylene to polyethylene having a broad or multimodal molecular weight distribution.

It is known that certain metallocenes such as bis(cyclopentadienyl) titanium or zirconium dialkyls in combination with aluminum alkyl co-catalyst, form homogeneous catalyst systems useful for the polymerization of ethylene. German patent application 2,608,863 discloses the use of a catalyst system for the polymerization of ethylene consisting of bis(cyclopentadienyl)-titanium dialkyl, aluminum trialkyl and water. German patent application 2,608,933 discloses an ethylene polymerization catalyst system consisting of zirconium metallocenes of the general formula (cyclopentadienyl)$_n$ZrY$_{4-n}$, wherein n stands for a number in the range of 1 to 4, Y for R, CH$_2$AlR$_2$, CH$_2$CH$_2$AlR$_2$ and CH$_2$CH(AlR$_2$)$_2$ wherein R stands for alkyl or metallo alkyl; an alumiunum trialkyl cocatalyst and water.

European Patent Appln. No. 0035242 discloses a process for preparing ethylene and atactic propylene polymers in the presence of a halogen-free Ziegler catalyst system of (1) a cyclopentadienyl compound of the formula (cyclopentadienyl)$_n$MeY$_{4-n}$ in which n is an integer from 1 to 4, Me is a transition metal, especially zirconium, and Y is either hydrogen, a C$_1$-C$_5$ alkyl or metallo alkyl group or a group of the general formula CH$_2$AlR$_2$, CH$_2$CH$_2$AlR$_2$ and CH$_2$CH(AlR$_2$)$_2$ in which R represents a C$_1$-C$_5$ alkyl or metallo alkyl group, and (2) an alumoxane.

The above disclosures demonstrate the usefulness of certain specific metallocenes in combination with certain aluminum compounds for the polymerization of ethylene and particularly polymerization at a high activity. The above described catalysts comprising titanium and zirconium metallocenes being homogeneous, produce polyethylenes of narrow molecular weight distribution (MWD) i.e. $\overline{M}w/\overline{M}n$ of from 2-4. Hence, the references neither disclose polyethylenes having a broad molecular weight distribution and/or a multimodal molecular weight distribution, nor how to obtain such polyethylenes.

U.S. Pat. No. 4,310,648 discloses a catalytic reaction product of a titanium compound, a zirconium compound, an organomagnesium compound and a halide source. The reaction product (a heterogeneous catalyst) when employed in combination with aluminum alkyls is useful for the production at high activity of broad molecular weight polyethylenes.

U.S. Pat. No. 4,361,685 discloses the use of organic soluble chrominum and zirconium compounds to be employed in combination with a supported catalyst system comprising an organometallic activating agent and a trivalent or tetravalent titanium compound. The polymers obtained have a high molecular weight and a narrow molecular weight distribution.

In "Molecular Weight Distribution And Stereoregularity Of Polypropylenes Obtained With Ti(OC$_4$H$_9$)-4/Al$_2$(C$_2$H$_3$)$_3$ Catalyst System"; Polymer, Pg. 469-471, 1981, Vol. 22, April, Doi, et al disclose propylene polymerization with a catalyst which at about 41° C. obtains a soluble catalyst and insoluble catalyst fraction, one with "homogeneous catalytic centres" and the other with "heterogeneous catalytic centres". The polymerization at that temperature obtains polypropylene having a bimodal molecular weight distribution.

It is highly desirable to have for many application, such as an extrusion and molding processes, polyethylenes which have a broad molecular weight distribution of the unimodal and/or the multimodal type. Such polyethylenes evidence excellent processability, i.e., they can be processed at a faster throughput rate with lower energy requirements and at the same time such polymers would evidence reduced melt flow perturbations.

In view of the foregoing problems, it would be highly desirable to provide a polymerization catalyst system of high activity to produce high quality ethylene polymers which evidence broad molecular weight distribution. It is furthermore highly desirable to be able to produce the ethylene polymers directly in a single reactor, i.e., without having to blend polyethylenes having different molecular weights and distributions in order to obtain the advantages of this invention.

SUMMARY OF THE INVENTION

The present invention provides polyethylene having a broad molecular weight and/or a multimodal molecular weight distribution. The polyethylenes are obtained directly from a single polymerization process, i.e., the polyethylenes of this invention are obtained without requiring blending techniques. The invention furthermore provides a catalyst system for the polymerization of ethylene directly to polyethylene having a broad molecular weight distribution especially a multimodal molecular weight distribution, and particularly a bimodal MWD. The invention further provides a process for polymerizing ethylene in the presence of the catalyst system.

Accordingly, there is provided catalyst systems and especially systems for the polymerization of ethylene to polyethylene having a broad molecular weight distribution and especially a bimodal or multimodal molecular weight distribution; said catalyst system comprising (a) at least two different metallocenes each having different propagation and termination rate constants for ethylene polymerizations and (b) an alumoxane. The metallocenes employed in accordance with this invention are organometallic coordination compounds which are cyclopentadienyl derivatives of a transition metal of Group 4b, 5b and 6b metals of the Periodic Table and include mono, di and tricyclopentadienyls and their derivatives of the transition metals. The metallocenes can be represented by the general formula (C$_5$R$'_m$)$_p$R''$_s$(C$_5$R$'_m$)MeQ$_{3-p}$ or R''$_s$(C$_5$R$'_m$)$_2$MeQ', wherein (C$_5$R$'_m$) is a cyclopentadienyl or substituted cyclopentadienyl, each R', which can be the same or different, is hydrogen or a hydrocarbyl radical such as alkyl, alkenyl, aryl, alkylaryl, or arylalkyl radical having from 1 to 20 carbon atoms or two carbon atoms of the cyclopentadienyl ring are joined together to form a C$_4$-C$_6$ ring, R'' is a C$_1$-C$_4$ alklylene radical, a dialkyl germanium or silicone or an alkyl phosphine or amine radical bridging two (C$_5$R$'_m$) rings, Q is a hydrocarbon radical such as aryl, alkyl, alkenyl, alkylaryl, or arylalkyl radical having from 1 to 20 carbon atoms or halogen and can be the same or different, Q' is an alkylidene radical having from 1 to about 20 carbon atoms, Me is a Group 4b, 5b and 6b metal of the Periodic Table (Chemical Rubber Company's Handbook of Chemistry and Physics, 48th Edition), s is 0 or 1, p is 0, 1 or 2; when p=0, s=0; m is 4 when s is 1 and m is 5 when s is 0.

The present invention also provides a process for producing polyethylenes having a high molecular weight as well as a broad molecular weight distribution and especially MWD of the bimodal type. The process comprises polymerizing ethylene alone or ethylene with minor amounts of higher alpha-olefins in the presence of the homogeneous catalyst system described above.

The present invention furthermore provides high molecular weight polyethylene having a bimodal molecular weight distribution.

It is highly surprising that two different metallocenes in combination with an alumoxane can produce polyethylene having a broad MWD since the individual metallocenes with an alumoxane generally obtains polyethylene having a narrow MWD. In accordance with this invention, however, one can advantageously tailor polyethylene having desired molecular weights and molecuar weight distributions by the judicious selection of metallocenes.

BRIEF DESCRIPTION OF THE FIGURES

FIG. 1 is a plot of the molecular weight distribution of polyethylene prepared as in Example 1 and in accordance with this invention.

FIG. 2 is a plot of the molecular weight distribution of polyethylene prepared as in comparative example 1B showing a narrow unimodal MWD.

FIG. 3 is a plot of the molecular weight distribution of polyethylene prepared as in comparitive example 1A showing a narrow unimodal MWD.

DETAILED DESCRIPTION OF THE INVENTION

Figure 4:
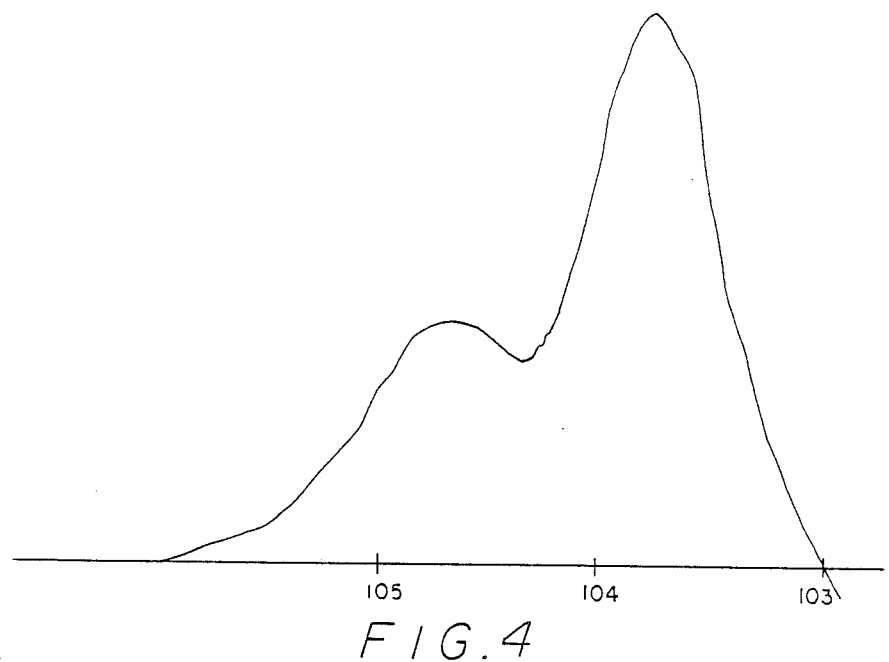
FIG. 4 is a plot of the molecular weight distribution of polyethylene prepared as in example 2 and showing a bimodal MWD.

The present invention is directed towards a catalytic process for the polymerization of ethylene to high molecular weight polyethylenes evidencing a broad and/or multimodal molecular weight distribution. The polymers are intended for fabrication into articles by extrusion, injection molding, thermoforming, rotational molding, and the like. In particular, the polymers of this invention are homopolymers of ethylene, however, minor amounts of higher alpha-olefins having from 3 to about 10 carbon atoms and preferably 4 to 8 carbon atoms can be copolymerized with ethylene. Illustrative of the higher alpha-olefins are butene-1, hexene-1 and octene-1.

In the process of the present invention, ethylene, either alone or together with minor amounts of alpha-olefins, is polymerized in the presence of a catalyst system comprising at least two metallocenes and an alumoxane.

The alumoxanes are well known in the art and are polymeric aluminum compounds which can be represented by the general formulae $(R-Al-O)_n$ which is a cyclic compound and $R(R-Al-O-)_n AlR_2$, which is a linear compound. In the general formula R is a $C_1-C_5$ alkyl group such as, for example, methyl, ethyl, propyl, butyl and pentyl and n is an integer from 1 to about 20. Most preferably, R is methyl. Generally, in the preparation of alumoxanes from, for example, aluminum trimethyl and water, a mixture of the linear and cyclic compounds are obtained.

The alumoxanes can be prepared in various ways. Preferably, they are prepared by contacting water with a solution of aluminum trialkyl, such as, for example, aluminum trimethyl, in a suitable organic solvent such as benzene or an aliphatic hydrocarbon. For example, the aluminum alkyl is treated with water in the form of a moist solvent or the aluminum alkyl such as aluminum trimethyl can be desirably contacted with a hydrated salt such as hydrated copper sulfate.

Preferably, the alumoxane is prepared in the presence of a hydrated copper sulfate. The method comprises treating a dilute solution of aluminum trimethyl in, for example, toluene, with copper sulfate represented by the general formula $CuSO_4.5H_2O$. The ratio of copper sulfate to aluminum trimethyl is desirably about 1 mole of copper sulfate for 5 moles of aluminum trimethyl. The reaction is evidenced by the evolution of methane.

The metallocenes employed each should have different propagation and termination rate constants with respect to ethylene polymerization. Such rate constants can be determined by one of ordinary skill in the art. The metallocenes are the organometallic coordination compound which are the mono, di and tricyclopentadienyls and their derivatives of a transition metal of Group 4b, 5b and 6b metals of the Periodic Table. The more desirable metallocenes employed in accordance with the invention are represented by the general formula $(C_5R'_m)_p R''_s (C_5R'_m) MeQ_{3-p}$ and $R''_s(C_5R'_m)_2 MeQ'$ wherein $(C_5R'_m)$ is cyclopentadienyl or substituted cyclopentadienyl, each R' is the same or different and is hydrogen or a hydrocarbyl radical such as alkyl, alkenyl, aryl, alkylaryl or arylalkyl radicals containing from 1 to 20 carbon atoms or two adjacent carbon atoms are joined together to form a $C_4-C_6$ ring, R'' is a $C_1-C_4$ alkylene radical, a dialkyl germanium or silicone or an alkyl phosphine or amine radical bridging two $(C_5R'_m)$ rings, Q is a hydrocarbyl radical such as aryl, alKyl, alkenyl, alkylaryl, or arylalkyl radical having from 1–20 carbon atoms or halogen and can be the same or different, Q' is an alkylidene radical having from 1 to about 20 carbon atoms, s is 0 or 1, p is 0, 1 or 2; when p is 0, s is 0; m is 4 when s is 1 and m is 5 when s is 0 and Me is a Group 4b, 5b or 6b metal of the Periodic Table.

Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl, and the like.

Exemplary alkylene radicals are methylene, ethylene, propylene, and the like.

Exemplary halogen atoms include chlorine, bromine and iodine and of these halogen atoms, chlorine is preferred.

Exemplary of the alkylid radicals is methylidene, ethylidene and propylidene.

The multiple metallocene system usefully employed in accordance with this invention are preferably the mono, bi and tricyclopentadienyl or substituted cyclopentadienyl titanium (IV) and zirconium (IV) compounds represented by the general formula.

Illustrative but non-limiting examples of the titanocenes which can be usefully employed in accordance with this invention are monocyclopentadienyl titanocenes, such as cyclopentadienyl titanium trichloride, pentamethylcyclopentadienyl titanium trichloride; bis(cyclopentadienyl) titanium diphenyl, the carbene represented by the formula Cp$_2$Ti=CH$_2$ . Al(CH$_3$)$_2$Cl, and derivatives of this reagent such as Cp$_2$Ti=CH$_2$ . Al(CH$_3$)$_3$, (Cp$_2$TiCH$_2$,

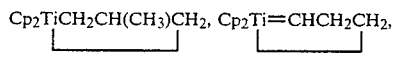

Cp$_2$Ti=CH$_2$ . AlR'''$_2$Cl, wherein Cp is a cyclopentadienyl or substituted cylopentadienyl radical, and R''' is an alkyl, aryl or alkylaryl radical having from 1-18 carbon atoms; substituted bis(Cp)Ti(IV) compounds such as bis(indenyl)Ti diphenyl or dichloride, bis(methylcyclopentadienyl)Ti diphenyl or dihalides and other dihalide complexes; dialkyl, trialkyl, tetra-alkyl and penta-alkyl cyclopentadienyl titanium compounds, such as bis(1,2-dimethylcyclopentadienyl)Ti diphenyl or dichloride, bis(1,2-diethylcyclopentadienyl)Ti diphenyl or dichloride and other dihalide complexes.

Illustrative but non-limiting examples of the zirconocenes which can be usefully employed in accordance with this invention are monocyclopentadienyl zirconocenes, such as cyclopentadienyl zirconium trichloride, pentamethyl cyclopentadienyl zirconium trichloride; bis(cyclopentadienyl)zirconium diphenyl, bis(cyclopentadienyl)zirconium dimethyl, the alkyl substituted cyclopentadienes, such as bis(ethyl cyclopentadienyl)zirconium dimethyl, bis($\beta$-phenylpropylcyclopentadienyl)zirconium dimethyl, bis(methylcyclopentadienyl)zirconium dimethyl, and dihalide complexes of the above. Di-alkyl, tri-alkyl, tetra-alkyl, and penta-alkyl cyclopentadienes, such as bis(pentamethylcyclopentadienyl)zirconium dimethyl, bis (1,2-dimethylcyclopentadienyl)zirconium dimethyl, bis(1,3-diethylcyclopentadienyl)zirconium dimethyl and dihalide complexes of the above. Silicone, phosphorus, and carbon bridged cyclopentadiene complexes such as dimethylsilyldicyclopentadienyl zirconium dimethyl or dihalide, methylphosphine dicyclopentadienyl zirconium dimethyl or dihalide, and methylene dicyclopentadienyl zirconium dimethyl or dihalide, carbenes represented by the formulae Cp$_2$Zr=CH$_2$P(C$_6$H$_5$)$_2$CH$_3$, and derivatives of these compounds such as

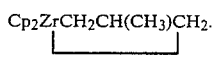

Bis(cyclopentadienyl)hafnium dichloride, bis(cyclopentadienyl)hafnium dimethyl, bis(cyclopentadienyl)vanadium dichloride are illustrative of other metallocenes.

The ratio of aluminum in the alumoxane to total metal in the metallocenes can be in the range of about 0.5:1 to about 10$^5$:1, and preferably about 5:1 to about 10$^3$:1. The molar ratio of zirconocene to titanocene can vary over a wide range and in accordance with this invention the only limitation on the molar ratios is the breadth of the MW distribution or the degree of bimodality desired in the product polymer. Desirably, the zirconocene to titanocene molar ratio will be about 1:100 to about 100:1, and preferably 1:10 to about 1:1.

The solvents used in the preparation of the catalyst system are inert hydrocarbons, in particular a hydrocarbon that is inert with respect to the catalyst system. Such solvents are well known and include, for example, butane, isobutane, pentane, hexane, heptane, octane, cyclohexane, methylcyclohexane, toluene, xylene and the like.

The catalyst systems described herein are suitable for the polymerization of ethylene either in solution, slurry or gas phase over a wide range of temperatures and pressures. For example, such temperatures may be in the range of about $-60°$ C. to about 280° C. and especially in the range of about 50° C. to 160° C. The pressures employed in the process of the present invention are those well known for, for example, in the range of about 1 to about 500 atmospheres and even greater.

In a solution phase polymerization the alumoxane and metallocene can be employed as a homogeneous catalyst system. The alumoxane is preferably dissolved in a suitable solvent, typically in inert hydrocarbon solvent such as toluene, xylene, and the like in molar concentrations of about 0.1M to 3M, however, greater or lesser amounts can be employed.

The soluble metallocenes can be converted to supported heterogeneous catalyst by depositing said metallocenes on typical catalyst supports such as, for example, silica, alumina, and polyethylene. The solid catalysts in combination with an alumoxane can be usefully employed in slurry and gas phase olefin polymerization.

After polymerization and deactivation of the catalyst, the product polymer can be recovered by processes well known in the art for removal of deactivated catalysts and solution. The solvents may be flashed off from the polymer solution and the obtained polymer extruded into water and cut into pellets or other suitable comminuted shapes. Pigments, antioxidants and other additives, as is known in the art, may be added to the polymer.

The polymer product obtained in accordance with this invention will have an average molecular weight in the range of about 500 to about 2,000,000 and preferably 10,000 to about 500,000. The polymer will also have concentrations of average molecular weights in the range of about 500 to about 100,000 and 100,000 to 1,000,000 for each sample.

The polymers produced by the process of this present invention are capable of being fabricated into a wide variety of articles, as is known for homopolymers of ethylene and copolymers of ethylene and higher alpha-olefins. The present invention is illustrated by the following examples.

In the examples following the molecular weights were determined on a Water's Associates Model No. 150C GPC (Gel Permeation Chromatography). The measurements were made by dissolving polymer samples in hot trichlorobenzene (TCB) and filtered. The GPC runs were performed at 145° C. in TCB at 1.5 ml/min using two Shodex A80 M/S Gel columns of 9.4 mm internal diameter from Perkin Elmer Inc. 300 milliliter of 3.1 percent solutions in TCB were injected and the chromotagraphic runs monitored at sensitivity equal $-64$ and scale factor equal 65. The samples were run in duplicate. The integration parameters were obtained with a Water's Associates data module. An antioxidant, N-phenyl-2-naphthylamine, was added to all samples.

EXAMPLES

In the examples following the alumoxane was prepared in the following manner:

600cc of a 14.5% solution of trimethylaluminum (TMA) in heptane was added in 30cc increments at 5 minute intervals, with rapid stirring, to 200cc toluene in a Zippoclave reactor under nitrogen and maintained at 100° C. Each increment was immediately followed by the addition of 0.3cc water. The reactor was vented of methane after each addition. Upon completion of the addition, the reactor was stirred for 6 hours while maintaining the temperature at 100° C. The mixture, contains soluble alumoxane and insoluble materials, is allowed to cool to room temperature and settle. The clear solution containing the soluble alumoxane is separated by decantation from the solids.

EXAMPLE 1

A 1-liter stainless steel pressure vessel, equipped with an incline blade stirrer, an external water jacket for temperature control, a septum inlet and vent line, and a regulated supply of dry ethylene and nitrogen, was dried and deoxygenated with a nitrogen flow. 500cc of dry, degassed toluene was introduced directly into the pressure vessel. 20.0 cc of alumoxane solution (0.64 molar in total aluminum) was injected into the vessel by a gas tight syringe through the septum inlet and the mixture was stirred at 1,200 rpms and 50° C. for 5 minutes at 0 psig of nitrogen. 0.091 mg bis(pentamethyl cyclopentadienyl)zirconium dimethyl dissolved in 1.0 ml of dry, distilled toluene was injected through the septum inlet into the vessel followed by the injection of 0.906 mg bis(cyclopentadienyl) titanium diphenyl in 10 ml of toluene. After 1 minute, ethylene at 50 psig was admitted and while the reaction vessel was maintained at 50° C. The ethylene was passed into the vessel for 40 minutes at which time the reaction was stopped by rapidly venting and cooling the reactor. 20.1 gms of powdery white polyethylene having a $\overline{M}n$ of 58,600 and a $\overline{M}w$ of 323,000 with a molecular weight distribution of 5.51. The GPC as shown in FIG. 1 showed a bimodal molecular weight distribution.

Comparative Example 1A

Ethylene was polymerized under conditions identical to that of Example 1 with the exception that the zirconocene only was employed in combination with the alumoxane. 0.102 mg of the zirconocene was employed. 20.6 gm of polyethylene was obtained. The polyethylene had a $\overline{M}n$ of 42,000 and $\overline{M}w$ of 139,000 with a MWD of 3.31. The GPC as appears in FIG. 3 evidenced a unimodal molecular weight distribution.

Comparative Example 1B

Ethylene was polymerized under conditions identical to that of Example 1 with the exception that the titanocene only was employed in combination with the alumoxane. 1.02 mg of the titanocene was employed. 13.2gm of polyethylene was obtained. The polyethylene had a $\overline{M}n$ of 184,000 and $\overline{M}w$ of 558,000 with a MWD of 3.03. The GPC as appears in FIG. 2 evidenced a unimodal molecular weight distribution.

EXAMPLE 2

A 1-liter stainless steel pressure vessel, equipped with an incline blade stirrer, an external water jacket for temperature control, a septum inlet and vent line, and a regulated supply of dry ethylene and nitrogen, was dried and deoxygenated with a nitrogen flow. 400cc of dry, degassed toluene was introduced directly into the pressure vessel. 20.0 cc of alumoxane (8 mmoles in total aluminum) was injected into the vessel by a gas tight syringe through the septum inlet and the mixture was stirred at 1,200 rpms and 80° C. for 5 minutes at 0 psig of nitrogen. 0.015 mg bis(cyclopentadienyl) zirconium dimethyl dissolved in 1.0 ml of dry, distilled toluene was injected through the septum inlet into the vessel followed by the injection of 5.18 mg bis(cyclopentadienyl)titanium diphenyl in 10 ml of toluene. After 1 minute, ethylene at 60 psig was admitted for 40 minutes while maintaining the reaction vessel at 80° C. The reaction was stopped by rapidly venting and cooling. 10.7 gms of powdery white polyethylene having a $\overline{M}n$ of 63,000 and a $\overline{M}w$ of 490,000 with a molecular weight distribution of 7.8. The GPC as shown in FIG. 4 showed a bimodal molecular weight distribution.

EXAMPLE 3

Figure 5:
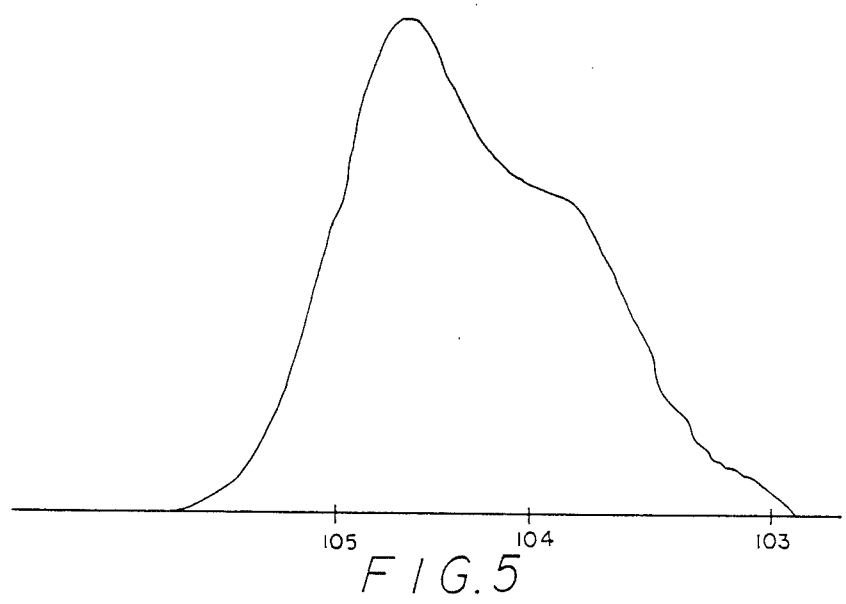
FIG. 5 is a plot of the molecular weight distribution of polyethylene prepared as in example 3 showing a bimodal MWD.

A 1-liter stainless steel pressure vessel, equipped with an incline blade stirrer, an external water jacket for temperature control, a septum inlet and vent line, and a regulated supply of dry ethylene and nitrogen, was dried and deoxygenated with a nitrogen flow. 400cc of dry, degassed toluene was introduced directly into the pressure vessel. 20.0 cc of alumoxane (8 mmoles in total aluminum) was injected into the vessel by a gas tight syringe through the septum inlet and the mixture was stirred at 1,200 rpms and 50° C. for 5 minutes at 0 psig of nitrogen. 0.151 mg bis(cyclopentadienyl) zirconium dimethyl dissolved in 1.0 ml of dry., distilled toluene was injected through the septum inlet into the vessel followed by the injection of 5.5 mg bis(cyclopentadienyl)titanium diphenyl in 10 ml of toluene. After 1 minute, ethylene at 60 psig was admitted for 40 minutes while maintaining the reaction vessel at 50° C. The reaction was stopped by rapidly venting and cooling. 13.8 gms of powdery white polyethylene having a $\overline{M}n$ of 16,500 and a $\overline{M}w$ of 89,000 with a molecular weight distribution of 5.4. The GPC as shown in FIG. 5 showed a bimodal molecular weight distribution.

EXAMPLE 4

A 1-liter stainless steel pressure vessel, equipped with an incline blade stirrer, an external water jacket for temperature control, a septum inlet and vent line, and a regulated supply of dry ethylene and nitrogen, was dried and deoxygenated with a nitrogen flow. 400cc of dry, degassed toluene was introduced directly into the pressure vessel. 20.0 cc of alumoxane (15 mmoles in total aluminum) was injected into the vessel by a gas tight syringe through the septum inlet and the mixture was stirred at 1,200 rpms and 80° C. for 5 minutes at 0 psig of nitrogen. 0.231 mg bis(cyclopentadienyl) zirconium dimethyl and 0.260 bis(ethylcyclopentadienyl)zirconium dimethyl, each dissolved in 1.0 ml of dry distilled toluene, were injected through the septum inlet into the vessel followed by the injection of 0.535 mg bis(cyclopentadienyl)titanium diphenyl in 10 ml of toluene. After 1 minute, ethylene at 60 psig was admitted for 40 minutes while maintaining the reaction vessel at 80° C. The reaction was stopped by rapidly venting and cooling. 24.0 gms of powdery white polyethylene having a $\overline{M}n$ of 43,000 and a $\overline{M}w$ of 191,000 with a molecular weight distribution of 4.4.

EXAMPLE 5

A 1-liter stainless steel pressure vessel, equipped with an incline blade stirrer, an external water jacket for temperature control, a septum inlet and vent line, and a regulated supply of dry ethylene and nitrogen, was dried and deoxygenated with a nitrogen flow. 400cc of dry, degassed toluene was introduced directly into the pressure vessel. 20.0 cc of alumoxane (15 mmoles in total aluminum) was injected into the vessel by a gas tight syringe through the septum inlet and the mixture was stirred at 1,200 rpms and 80° C. for 5 minutes at 0 psig of nitrogen. 0.201 mg bis(cyclopentadienyl)zirconium dimethyl and 0.216 mg bis(ethyl cyclopentadienyl)zirconium dimethyl each dissolved in 1.0 ml of dry distilled toluene were injected through the septum inlet into the vessel followed by the injection of 0.506 mg bis(cyclopentadienyl) titanium diphenyl in 10 ml of toluene. After 1 minute, ethylene at 50 psig was admitted for 40 minutes while maintaining the reaction vessel at 80° C. The reaction was stopped by rapidly venting and cooling. 25.2 gms of powdery white polyethylene having a $\overline{M}n$ of 39,700 and a $\overline{M}w$ of 168,000 with a molecular weight distribution of 4.2 and bimodal $\overline{M}w$ distribution.

EXAMPLE 6

A 1-liter stainless steel pressure vessel, equipped with an incline blade stirrer, an external water jacket for temperature control, a septum inlet and vent line, and a regulated supply of dry ethylene and nitrogen, was dried and deoxygenated with a nitrogen flow. 500cc of dry, degassed toluene was introduced directly into the pressure vessel. 10.0 cc of alumoxane (8 moles total aluminum) was injected into the vessel by a gas tight syringe through the septum inlet and the mixture was stirred at 1,200 rpms and 80° C. for 5 minutes at 0 psig of nitrogen. 0.260 mg bis(cyclopentadienyl)zirconium dimethyl and 0.204 mg bis(ethyl cyclopentadienyl)zirconium dimethyl each dissolved in 1.0 ml of dry distilled toluene were injected through the septum inlet into the vessel. After 1 minute, ethylene at 60 psig was admitted for 12 minutes while maintaining the reaction vessel at 80° C. The reaction was stopped by rapidly venting and cooling. 32.0 gms of powdery white polyethylene having a $\overline{M}n$ of 47,100 and a $\overline{M}w$ of 183,000 with a molecular weight distribution of 3.9.

The invention claimed is:

1. A catalyst system for the (co)polymerization of ethylene to polyethylene having a broad molecular weight distribution, said catalyst comprising (a) at least two different metallocenes selected from mono, di or tricyclopentadienyls and substituted cyclopentadienyls of a Group 4b, 5b and 6b transition metal each having different propagation and termination rate constants of ethylene polymerizations and (b) an alumoxane.

2. The catalyst system of claim 1 wherein the transition metals are selected from titanium and zirconium.

3. A catalyst system for the (co)polymerization of ethylene to polyethylene having a broad and/or multimodal molecular weight distribution; said catalyst comprising:
(a) at least two or more metallocenes represented by the general formula $(C_5R'_m)_pR''_s(C_5R'_m)MeQ_{3-p}$ or $R''_s(C_5R'_m)_2MeQ'$, each having a different propagation and termination rate constant for ethylene polymerization, and
(b) an alumoxane wherein $(C_5R'_m)$ is a cyclopentadienyl or substituted cyclopentadienyl, each R' which can be the same or different is hydrogen or a hydrocarbyl radical selected from alkyl, alkenyl, aryl, alkylaryl, or arylalkyl radicals having from 1 to 20 carbon atoms or two carbon atoms of the cyclopentadienyl ring are joined together to form a $C_4$-$C_6$ ring, R'' is a $C_1$-$C_4$ alkylene radical, a dialkyl germanium or silicone or alkyl phosphine or amine radical bridging two $(C_5R'_m)$ rings, Q is a hydrocarbon radical selected from aryl, alkyl, alkenyl, alkylaryl, or arylalkyl radicals having from 1–20 carbon atoms or halogen and can be the same or different, Q' is an alkylidene radical having from 1 to about 20 carbon atoms, Me is a Group 4b, 5b or 6b metal, s is 0 or 1, p is 0, 1 or 2, when p is 0, s is 0; m is 4 when s is 1 and m is 5 when s is 0.

4. The catalyst system of claim 3 comprising two zirconocenes.

5. The catalyst system of claim 3 comprising two titanocenes.

6. The catalyst system of claim 4 comprising at least 2 zirconocenes and 1 titanocene.

7. The homogeneous catalyst system of claim 5 comprising at least 2 titanocenes and 1 zirconocene.

* * * * *